US009955288B2

(12) United States Patent
Kim

(10) Patent No.: US 9,955,288 B2
(45) Date of Patent: Apr. 24, 2018

(54) ELECTRONIC DEVICE AND OPERATION METHOD OF THE SAME

(71) Applicant: SAMSUNG ELECTRONICS CO., LTD., Suwon-si (KR)

(72) Inventor: Wan-su Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 15/013,370

(22) Filed: Feb. 2, 2016

(65) Prior Publication Data

US 2016/0227356 A1 Aug. 4, 2016

(30) Foreign Application Priority Data

Feb. 4, 2015 (KR) .................. 10-2015-0017467

(51) Int. Cl.
*H04W 4/00* (2009.01)
*G06F 3/147* (2006.01)
*G06F 3/0482* (2013.01)
*G06F 3/0484* (2013.01)
*H04W 4/08* (2009.01)
*H04M 1/725* (2006.01)
*G06F 3/14* (2006.01)

(52) U.S. Cl.
CPC .......... *H04W 4/008* (2013.01); *G06F 3/0482* (2013.01); *G06F 3/04847* (2013.01); *G06F 3/147* (2013.01); *G06F 3/1454* (2013.01); *H04M 1/7253* (2013.01); *H04M 1/72519* (2013.01); *H04W 4/08* (2013.01); *G09G 2300/023* (2013.01); *G09G 2370/16* (2013.01)

(58) Field of Classification Search
CPC ....................................................... H04W 4/008
USPC ..................................... 455/41.1, 41.2, 41.3
See application file for complete search history.

(56) References Cited

U.S. PATENT DOCUMENTS

| 8,554,282 B2 * | 10/2013 | Chang ................ H04M 1/7253 455/41.2 |
| 2002/0197993 A1 * | 12/2002 | Cho ....................... H04L 29/06 455/435.1 |
| 2009/0160731 A1 * | 6/2009 | Schuler ................ G06F 3/1423 345/1.1 |
| 2010/0077009 A1 | 3/2010 | Park |
| 2011/0037712 A1 * | 2/2011 | Kim .................... H04M 1/7253 345/173 |
| 2012/0021682 A1 * | 1/2012 | Tabaaloute .......... H04L 12/2812 455/41.1 |

(Continued)

FOREIGN PATENT DOCUMENTS

| JP | 9 244600 A | 9/1997 |
| JP | 2006215407 A | 8/2006 |

(Continued)

*Primary Examiner* — Wen Huang
(74) *Attorney, Agent, or Firm* — Sughrue Mion, PLLC

(57) ABSTRACT

An electronic device, including a short-range wireless communicator; and a controller configured to search for at least one display device connected to the electronic device through the short-range wireless communicator, group the at least one display device into at least one group, make a determination whether to deliver content information to the at least one group, and control the short-range wireless communicator to deliver group-specific content information to the at least one group based on the determination.

20 Claims, 23 Drawing Sheets

(56) References Cited

U.S. PATENT DOCUMENTS

| | | | | |
|---|---|---|---|---|
| 2012/0270502 A1* | 10/2012 | Kazawa | ............... | H04B 17/27 |
| | | | | 455/41.2 |
| 2012/0298744 A1* | 11/2012 | Hung | ............... | H04L 12/1886 |
| | | | | 235/375 |
| 2013/0225078 A1* | 8/2013 | Johansson | ............. | H04W 76/02 |
| | | | | 455/41.2 |
| 2013/0252656 A1* | 9/2013 | Lee | ................. | H04W 4/08 |
| | | | | 455/519 |
| 2014/0164131 A1 | 6/2014 | Kim et al. | | |
| 2014/0315489 A1* | 10/2014 | Lee | ................. | G06F 3/1454 |
| | | | | 455/41.2 |

FOREIGN PATENT DOCUMENTS

| | | |
|---|---|---|
| JP | 2013247405 A | 12/2013 |
| KR | 1020100030435 A | 3/2010 |
| KR | 1020130048525 A | 5/2013 |
| KR | 1020130128566 A | 11/2013 |
| KR | 1020140059966 A | 5/2014 |
| KR | 1020140076274 A | 6/2014 |

\* cited by examiner

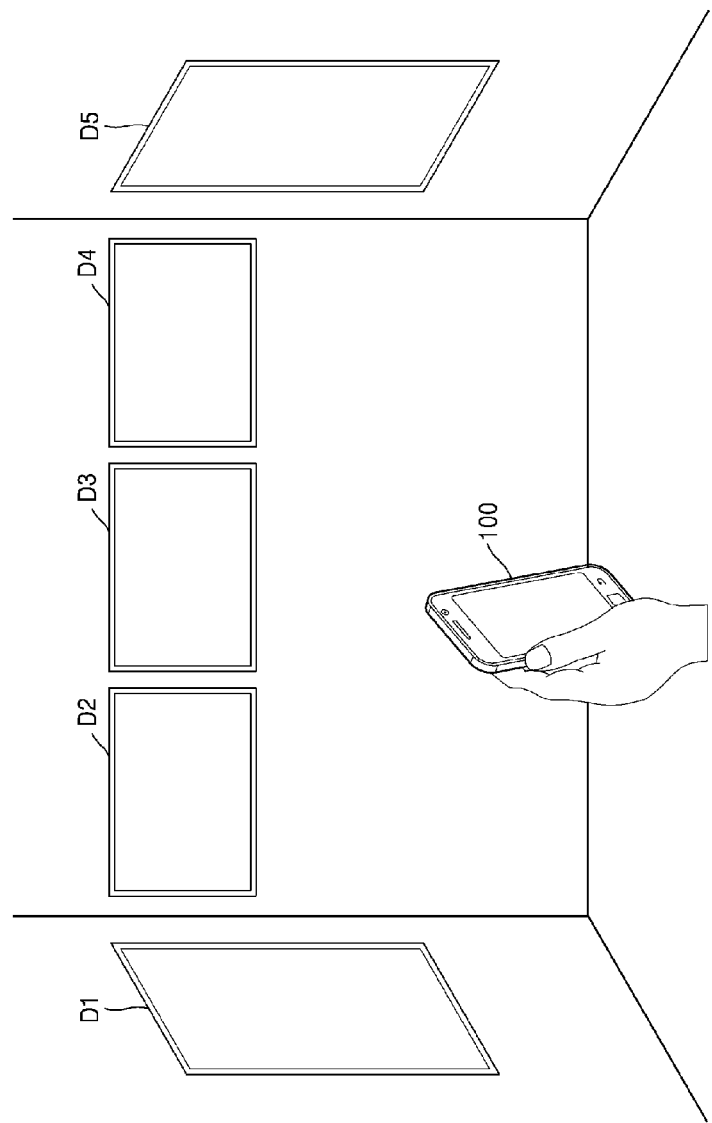

FIG. 4

| GROUPING | MEMBER | CONTENT INFORMATION | DELIVERY |
|---|---|---|---|
| G1 | D2, D3, D4 | CD1 | Yes |
| G2 | D1, D5 | CD2 | Yes |

| GROUP | MEMBER | CONTENT INFORMATION |
|---|---|---|
| G1 | D2, D3, D4 | CD1 |
| G2 | D1, D5 | CD2 |

| GROUP | MEMBER | CONTENT INFORMATION |
|---|---|---|
| G1 | D2, D3, D4 | CD3 |
| G2 | D1, D5 | CD2 |

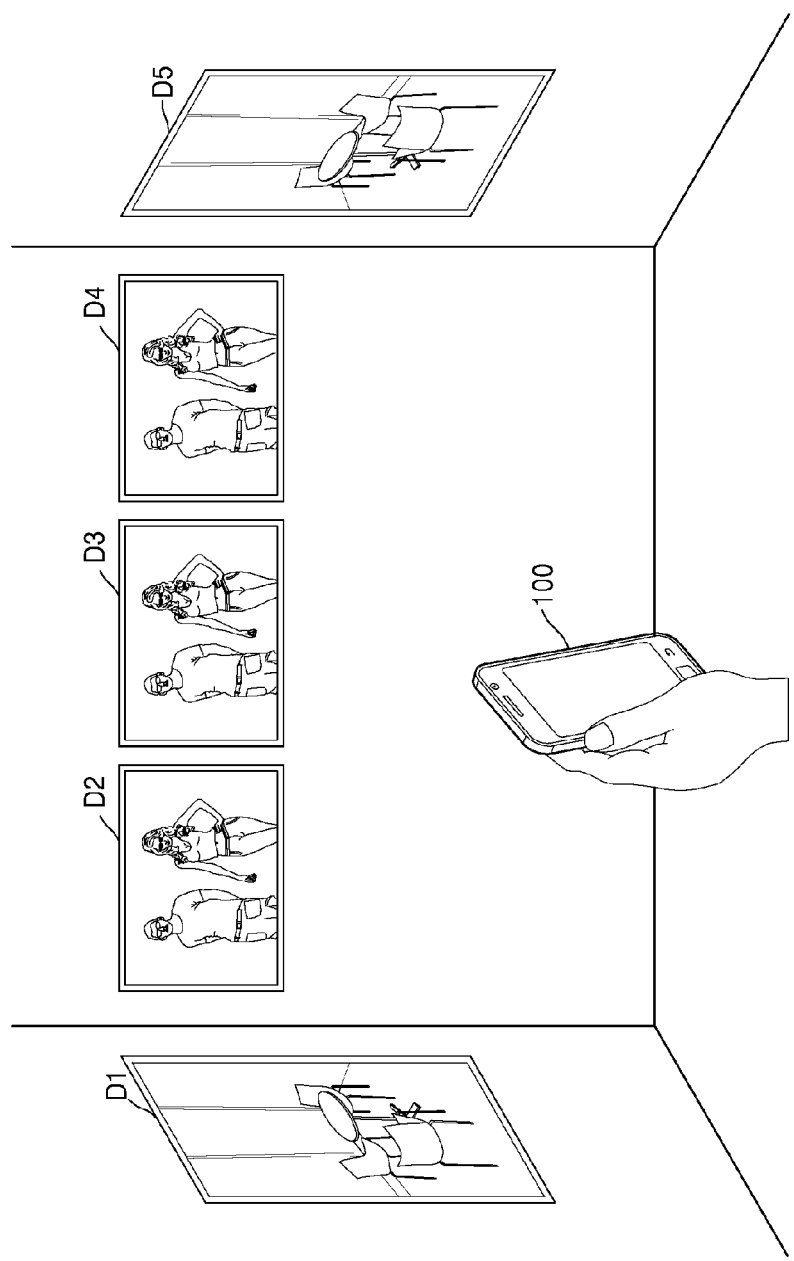

FIG. 8

| GROUP | MEMBER | CONTENT INFORMATION | DELIVERY |
|---|---|---|---|
| G1 | D2, D3, D4 | CD3 | Yes |
| G2 | D1, D5 | CD2 | No |

| GROUP | MEMBER | CONTENT INFORMATION |
|---|---|---|
| G1 | D2, D3, D4 | CD3 |
| G2 | D1, D5 | CD2 |

| GROUP | MEMBER | CONTENT INFORMATION |
|---|---|---|
| G1 | D2, D3, D4 | CD3 |
| G2 | D1, D5 | CD4 |
| – | – | CD5 |

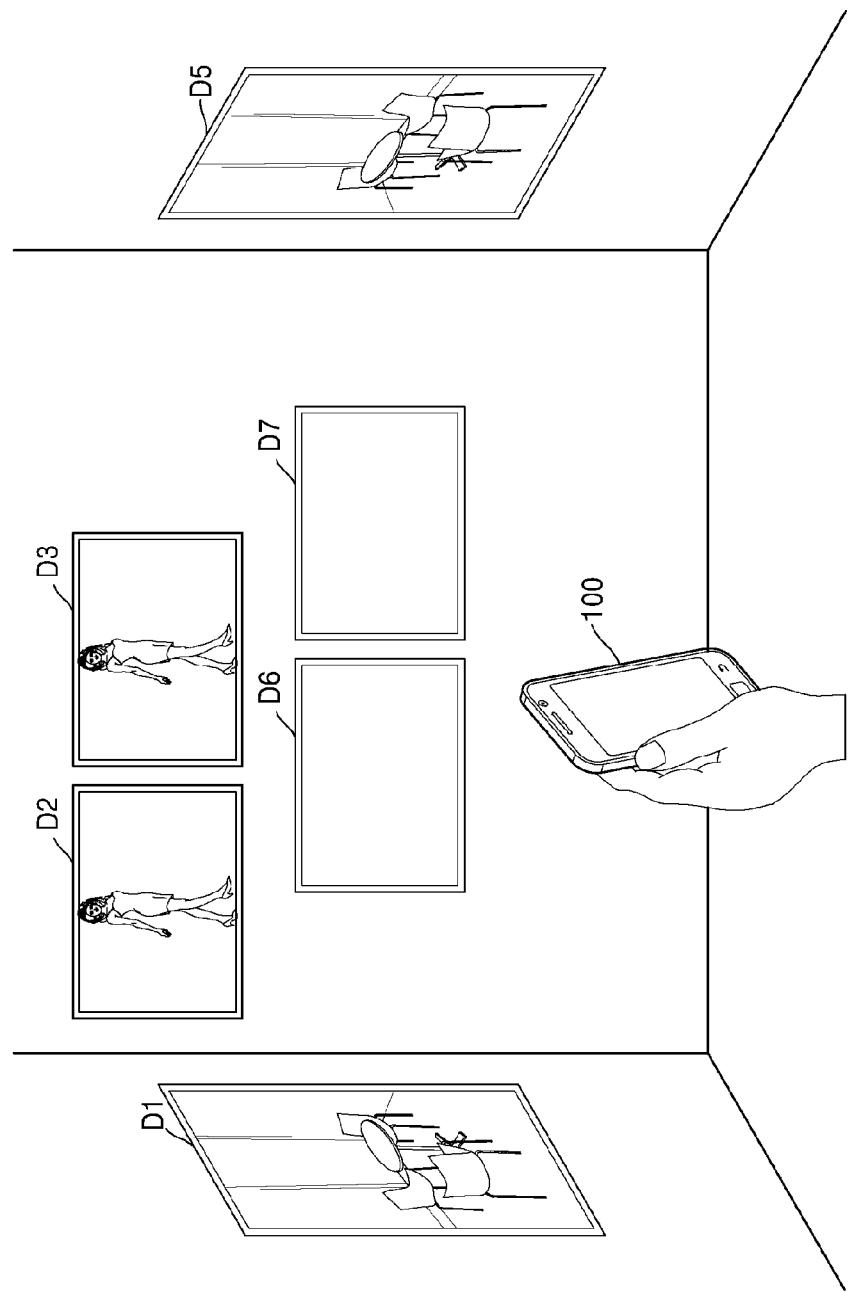

FIG. 12A          FIG. 12B          FIG. 12C

| SEARCH LIST | GROUPING |
|---|---|
| D1 | G2 |
| D2 | G1 |
| D3 | G1 |
| D5 | G2 |
| D6 | - |
| D7 | - |

| SEARCH LIST | GROUPING |
|---|---|
| D1 | G2 |
| D2 | G1 |
| D3 | G1 |
| D5 | G2 |
| D6 | G3 |
| D7 | G3 |

| SEARCH LIST | GROUPING |
|---|---|
| D1 | G2 |
| D2 | G1 |
| D3 | G1 |
| D5 | G2 |
| D6 | G3 |
| D7 | G4 |

FIG. 13A
FIG. 13B
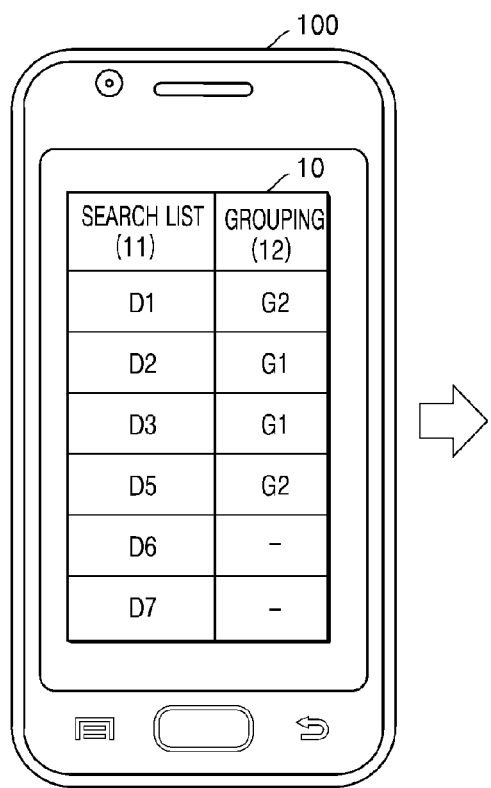
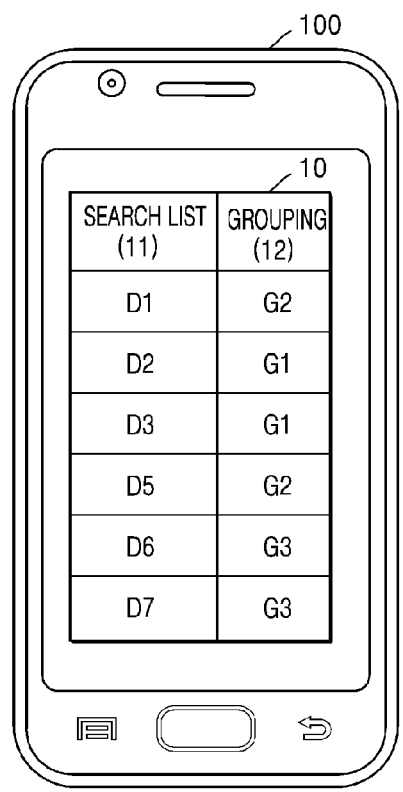

FIG. 14

| GROUP | MEMBER | CONTENT INFORMATION | DELIVERY |
|---|---|---|---|
| G1 | D2, D3 | CD3 | No |
| G2 | D1, D5 | CD4 | Yes |
| G3 | D6, D7 | CD5 | Yes |

ELECTRONIC DEVICE AND OPERATION METHOD OF THE SAME

CROSS-REFERENCE TO RELATED APPLICATION

This application claims benefit from Korean Patent Application No. 10-2015-0017467, filed on Feb. 4, 2015, in the Korean Intellectual Property Office, the disclosure of which is incorporated herein in its entirety by reference.

BACKGROUND

1. Field

The present disclosure relates to an electronic device and an operation method of the same, and more particularly, to an electronic device and an operation method of the same which may efficiently distribute content information to a plurality of display devices.

2. Description of the Related Art

With the prevalence of display devices, the case in which a display device is used to provide various advertising content information is increasing in number. In a store, a plurality of display devices may be installed at positions attracting customers' attention in order to advertise goods for sale to customers who visit the store, and each of the display devices may deliver various advertising messages to customers by outputting content.

However, when there are a plurality of display devices, it may be inconvenient to distribute content information to the plurality of display devices or redistribute content information which is updated after distribution of content information. Therefore, a method for efficiently distributing content information to a plurality of display devices is necessary.

SUMMARY

Provided are an electronic device and an operation method of the same which may efficiently distribute content information to a plurality of display devices.

Additional aspects will be set forth in part in the description which follows and, in part, will be apparent from the description, or may be learned by practice of the presented exemplary embodiments.

According to an aspect of an exemplary embodiment, an electronic device includes a short-range wireless communicator; and a controller configured to search for at least one display device connected to the electronic device through the short-range wireless communicator, group the at least one display device into at least one group, make a determination whether to deliver content information to the at least one group, and control the short-range wireless communicator to deliver group-specific content information to the at least one group based on the determination.

The controller may be further configured to group the at least one display device into the at least one group based on at least one from among user input and predetermined group information.

The controller may be further configured to make the determination whether to deliver the content information to the at least one group if the group-specific content information is different from pre-stored content information stored in the at least one display device of the at least one group.

The short-range wireless communicator may be further configured to receive at least one identifier corresponding to the pre-stored content information stored in the at least one display device from the at least one display device.

The controller may be further configured to make the determination whether to deliver the content information to the at least one group based on at least one from among user input and whether the group-specific content information has been changed.

The electronic device may further include a display configured to output a user interface (UI) for grouping the at least one display device.

The electronic device may further include a user input interface configured to receive user input for setting at least one group name for identifying the at least one group.

The UI output by the display may be in a form corresponding to a physical arrangement of the at least one display device.

The controller may be further configured to acquire image data obtained by photographing the at least one display device, and configures the UI based on the image data.

The electronic device may further include a memory configured to store at least one from among group information indicating a relationship between the at least one group and at least one identifier of the at least one display device and predetermined group-specific content information.

According to another aspect of an exemplary embodiment, an operation method of an electronic device includes searching for at least one display device connected to the electronic device through a short-range wireless communicator; grouping the at least one display device into at least one group; determining whether to deliver content information to the at least one group; and delivering group-specific content information to the at least one group through the short-range wireless communicator based on a result of the determining.

The grouping of the at least one display device into the at least one group may further include grouping the at least one display device into the at least one group based on at least one from among user input and predetermined group information.

The determining of whether to deliver the content information may further include determining to deliver the group-specific content information to the at least one group if the group-specific content information is different from pre-stored content information stored in the at least one display device of the at least one group.

The operation method may further include receiving at least one identifier of the pre-stored content information stored in the at least one display device from the at least one display device through the short-range wireless communicator.

The determining of whether to deliver the content information may further include determining whether to deliver the group-specific content information to the at least one group based on at least one from among user input and whether the group-specific content information has been changed.

The operation method may further include outputting a user interface (UI) for grouping the at least one display device on a screen.

The operation method may further include receiving user input for setting at least one group name for identifying the at least one group.

The UI is output in a form corresponding to a physical arrangement of the at least one display device.

The operation method may further include: acquiring image data obtained by photographing the at least one display device; and configuring the UI based on the image data.

According to yet another aspect of an exemplary embodiment, a non-transitory computer-readable recording medium may include a program for implementing the operation method.

According to a further exemplary embodiment, a method for controlling an electronic device includes searching for a plurality of display devices connected to the electronic device through a short-range wireless communicator; grouping the plurality of display devices into a first group and a second group; determining whether to deliver first content information to the first group and second content information to the second group; and delivering the first content information to the first group and the second content information to the second group through the short-range wireless communicator based on a result of the determining.

The method may further include determining to deliver the first content information to first group if the first content information has been changed, and determining to deliver the second content information to the second group if the second content information has been changed.

BRIEF DESCRIPTION OF THE DRAWINGS

These and/or other aspects will become apparent and more readily appreciated from the following description of the exemplary embodiments, taken in conjunction with the accompanying drawings in which:

FIG. 2 is a diagram illustrating an example of operation of an electronic device and display devices according to some exemplary embodiments;

FIG. 4 shows an example in which an electronic device according to some exemplary embodiments determines whether or not to deliver content information to each group when searched display devices are grouped as shown in FIGS. 3A and 3B;

FIGS. 7 to 9 are diagrams illustrating operation of an electronic device according to some exemplary embodiments after distributing content to display devices as shown in FIG. 5 and then updating content information as shown in FIGS. 6A and 6B;

FIGS. 11, 12A-12C, 13A-13B, 14, and 15 are diagrams illustrating an example of operation of an electronic device and display devices after the electronic device distributes content to the display devices as shown in FIG. 9 and then updates content information as shown in FIGS. 10A and 10B;

DETAILED DESCRIPTION

Figure 1:
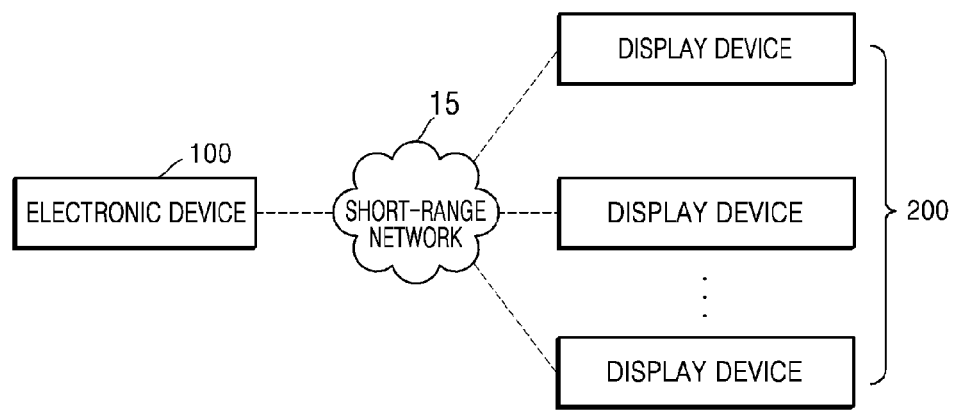
FIG. 1 shows an electronic device and display devices according to some exemplary embodiments.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 shows an electronic device 100 and display devices 200 according to some exemplary embodiments.

Referring to FIG. 1, the electronic device 100 may be connected to at least one display device 200 through a short-range network 15.

The electronic device 100 may be a smart phone, a tablet PC, a PC, a smart TV, a cellular phone, a personal digital assistant (PDA), a laptop computer, a media player, a micro server, a global positioning system (GPS) device, an electronic (e)-book terminal, a digital broadcasting terminal, a navigation device, a kiosk, an MP3 player, a digital camera, and another mobile or non-mobile computing device, but is not limited thereto.

Each of the at least one display device 200 may be a liquid crystal display (LCD), a cathode ray tube (CRT) display, a plasma display panel (PDP) display, an organic light emitting diode (OLED) display, a field emission display (FED), a light emitting diode (LED) display, a vacuum fluorescence display (VFD), a digital light processing (DLP) display, a flat panel display (FPD), a three-dimensional (3D) display, a transparent display, etc., but is not limited thereto.

In some exemplary embodiments, the at least one display device 200 may be plural in number, and may be configured to be used as one integrated display device forming one large screen.

The short-range network 15 wirelessly connects electronic equipment, such as the electronic device 100, the at least one display device 200, etc., a predetermined distance away from each other, thereby enabling communication with each other. Examples of the short-range network 15 may include a wireless personal area network (WPAN), a wireless local area network (WLAN), a wireless fidelity (Wi-Fi) network, a Bluetooth network, a ZigBee network, a Wi-Fi direct (WFD) network, an ultra wideband (UWB) network, an infrared data association (IrDA) network, a Bluetooth low energy (BLE) network, a near field communication (NFC) network, a Z-wave network, etc., but are not limited thereto.

The electronic device 100 may generate, change, store, or output content. The electronic device 100 may generate content by itself, or may be provided with content from an external device, such as a server, through a wired or wireless communication network. Content is digital information. Content may include moving image content (e.g., a TV program image, a video on demand (VOD), a user-created content (UCC), a music video, an YouTube image, etc.), still image content, (e.g., a photograph, a drawing, etc.), text content (e.g., an e-book (a collection of poems or a novel), a letter, or a work file), music content (e.g., a piece of music, a musical program, a radio broadcast, etc.), a web page, application execution information, etc., but is not limited thereto. Content may be intended for advertising.

Also, the electronic device 100 may set, store, or change scheduling information of content. In some exemplary embodiments, the electronic device 100 may be provided with scheduling information of content as well as the content from an external device. The scheduling information of content may include an output time, an output sequence, output rules, etc. of the content. The electronic device 100 may set, store, or change scheduling information of a plurality of pieces of content. The scheduling information may include the number, an output sequence, output rules, etc. of the plurality of pieces of content.

Throughout this specification, "content information" may include information including at least one of content and scheduling information of the content.

The electronic device 100 may deliver content information to the at least one display device 200 connected through the short-range network 15. The at least one display device 200 may output content based on the content information received from the electronic device 100. In some exemplary embodiments, the at least one display device 200 may output the content according to scheduling information.

FIG. 2 is a diagram illustrating an example of operation of the electronic device 100 and display devices D1 to D5 according to some exemplary embodiments.

Referring to FIG. 2, the electronic device 100 may search at least one display device connected through a short-range network, for example, the first to fifth display devices D1 to D5. Initially, the first to fifth display devices D1 to D5 may not output any content.

FIG. 2 shows the five display devices D1 to D5 but does not limit the number or the arrangement of a plurality of display devices.

Figures 3A, 3B:
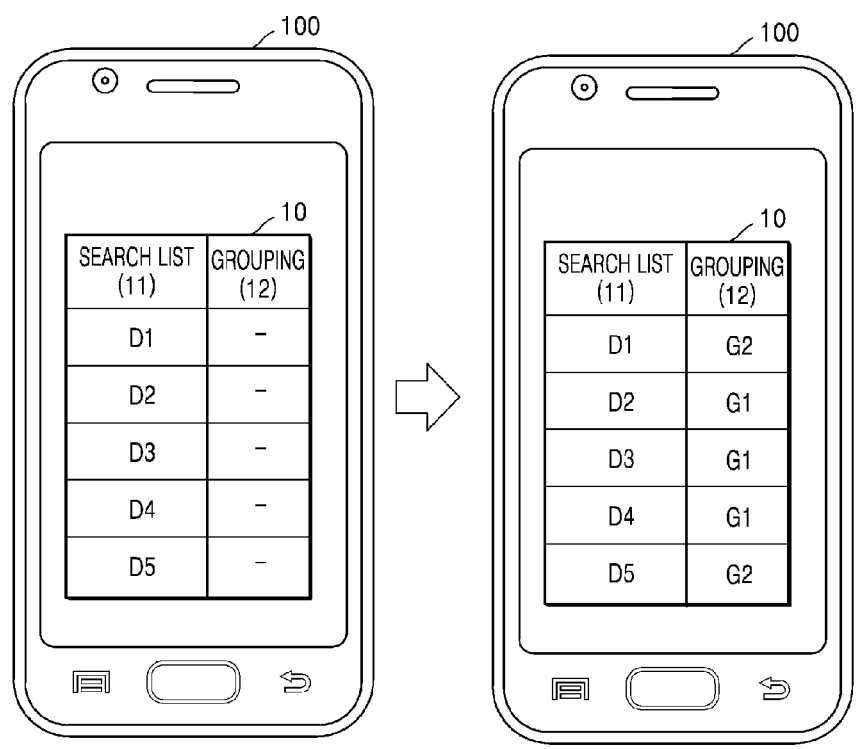
FIGS. 3A and 3B show an example in which an electronic device according to some exemplary embodiments groups searched display devices D1 to D5.

FIGS. 3A-3B show an example in which the electronic device 100 according to some exemplary embodiments groups the searched display devices D1 to D5.

Referring to FIGS. 2 and 3A, the electronic device 100 may output a user interface (UI) 10 for grouping the searched display devices D1 to D5. The UI 10 may include a search list 11 showing the searched display devices D1 to D5 and a grouping menu 12.

As shown in FIG. 3A, initially, none of the searched display devices D1 to D5 may be grouped. In other words, no group information may be set in the electronic device 100. The electronic device 100 may group the searched display devices D1 to D5 into at least one group based on an input of a user.

Referring to FIG. 3B, the electronic device 100 may classify the first display device D1 and the fifth display device D5 into a second group G2, and classify the other display devices D2 to D4 into a first group G1. The user may classify display devices to which the same content information will be distributed through the electronic device 100 into the same group.

The groupings shown in FIG. 3B are just one example, and the plurality of display devices D1 to D5 may be grouped in various combinations.

FIG. 3B shows an example in which group names for identifying groups are "G1" and "G2," but a group name may be set in various ways as at least one combination of a character, a number, a figure, a color, and so on. A group name may be set or changed by default or user input. The user may input a group name which facilitates recognition of display devices belonging to each group to the electronic device 100. For example, based on user input, the electronic device 100 may set the group names of the first group G1 and the second group G2 to "Wall surface" and "Front surface," respectively. Also, the electronic device 100 may automatically set installation positions in a store, etc. as group names so that the group names may be readily recognized by the user.

The UI 10 output through the electronic device 100 shown in FIGS. 3A-3B is one example, and the electronic device 100 may output a UI in various ways to group the searched display devices D1 to D5.

FIG. 4 shows an example in which an electronic device according to some exemplary embodiments determines whether to deliver content information to each group when searched display devices are grouped as shown in FIGS. 3A-3B.

Referring to FIGS. 3A, 3B, and 4, as groupings shown in FIGS. 3A and 3B, the second to fourth display devices D2 to D4 belong to the first group G1, and the first and fifth display devices D1 and D5 belong to the second group G2.

The electronic device 100 may determine whether to deliver content information CD1 and CD2 to the groups G1 and G2, respectively. Then, the electronic device 100 may deliver content information of a determined group to the determined group.

Based on user input, the electronic device 100 may determine whether to deliver the content information CD1 and CD2 to the groups G1 and G2, respectively. To this end, the electronic device 100 may output a UI for determining whether to deliver the content information CD1 and CD2 respectively to the groups G1 and G2 on the screen.

Based on the user input, the electronic device 100 may determine the group-specific (for example, G1 and G2) content information CD1 and CD2. To this end, the electronic device 100 may output a UI for setting group-specific content information on the screen.

For example, the electronic device 100 may output a UI in the form of a table as shown in FIG. 4 on the screen. Based on user input, the electronic device 100 may set or change the group-specific content information CD1 and CD2, and determine whether or not to deliver the content information CD1 and CD2 to the groups G1 and G2, respectively.

In FIG. 4, it is assumed that the electronic device 100 has determined to deliver the content information CD1 and CD2 to the groups G1 and G2, respectively.

Group-specific members, group-specific content information, and whether to deliver content information to each of the groups G1 and G2 shown in FIG. 4 are examples, and group-specific members, group-specific content information, and whether or not to deliver content information to each group are not limited thereto.

Figure 5:
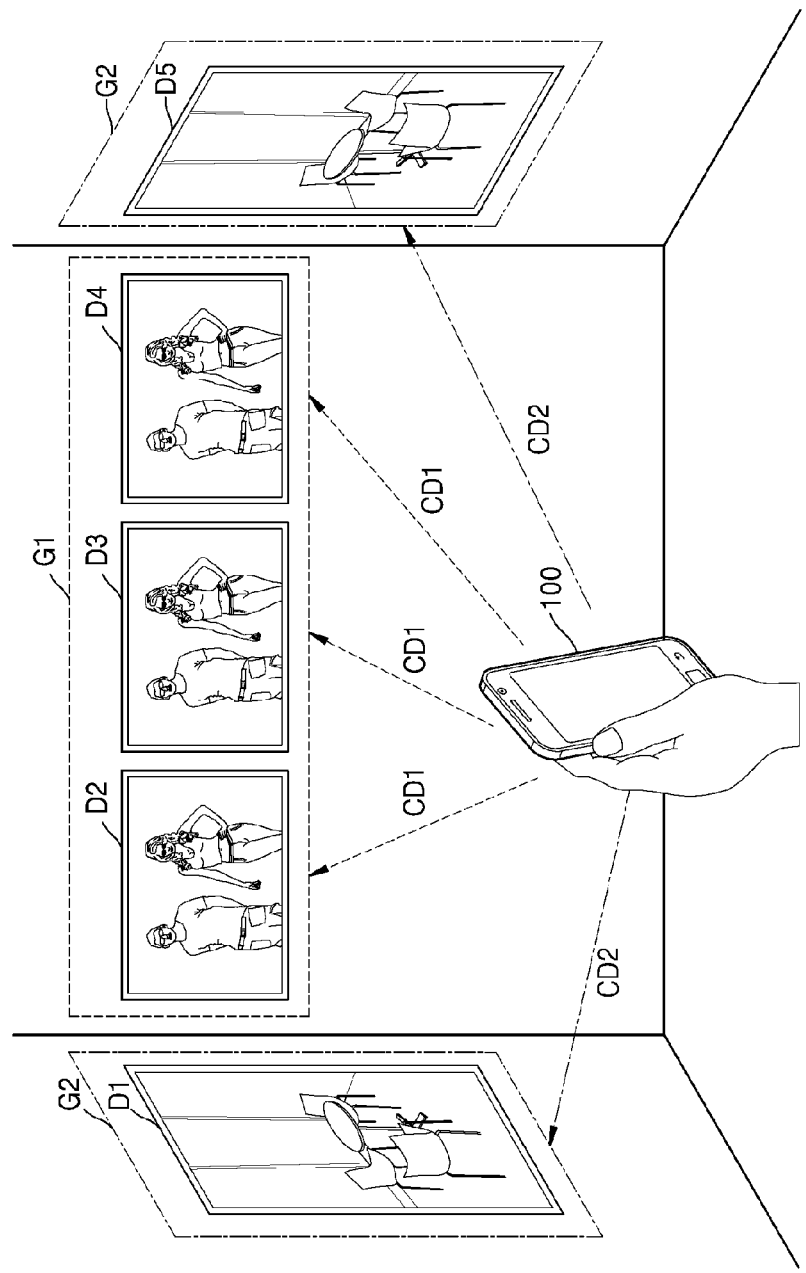
FIG. 5 is a diagram showing an example in which an electronic device determines whether or not to deliver content information to each group as shown in FIG. 4 and then delivers content information.

FIG. 5 is a diagram showing an example in which the electronic device 100 delivers content information after determining whether or not to deliver content information to each group as shown in FIG. 4.

Referring to FIGS. 4 and 5, after determining to deliver the content information CD1 and CD2 respectively to the groups G1 and G2, the electronic device 100 may deliver the first content information CD1 which is content information of the first group G1 to the second to fourth display devices D2 to D4 belonging to the first group G1 and deliver the second content information CD2 which is content information of the second group G2 to the first and fifth display devices D1 and D5 belonging to the second group G2.

The second to fourth display devices D2 to D4 may output content based on the first content information CD1 received from the electronic device 100, and the first and fifth display device D1 and D5 may output content based on the second content information CD2 received from the electronic device 100. In other words, display devices belonging to the same group may output the same content.

After distributing content information to the display devices D1 to D5 according to groups as shown in FIG. 5, the electronic device 100 may update the content information. For example, the electronic device 100 may generate new content information, or may change or remove the existing content information. There may be a random time difference between the distribution of content information and the update of content information. Even when the electronic device 100 is not connected to the display devices D1 to D5, the electronic device 100 may update the content information. In other words, the electronic device 100 may update the content information at a random location.

Figures 6A, 6B:
FIGS. 6A and 6B show an example of content information updated by an electronic device according to some exemplary embodiments.

FIGS. 6A and 6B show an example of content information updated by an electronic device according to some exemplary embodiments.

Referring to FIGS. 6A and 6B, the electronic device 100 may update content information shown in FIG. 6A as shown in FIG. 6B. FIG. 6A is an example of content information stored as operation results in the electronic device 100 shown in FIG. 5.

Referring to FIG. 6A, content information of the first group G1 including the second to fourth display devices D2 to D4 may be the first content information CD1, and content information of the second group G2 including the first and fifth display devices D1 and D5 may be the second content information CD2.

Referring to FIG. 6B, the electronic device 100 may change the first content information CD1 which is content information of the first group G1 to third content information CD3. The third content information CD3 may be obtained by changing at least one of content and scheduling information of the content included in the first content information CD1. The electronic device 100 may generate the third content information CD3 by itself, obtain the third content information CD3 by modifying the first content information CD1, or receive the third content information CD3 from an external device connected through a wired or wireless communication network.

Figure 9:
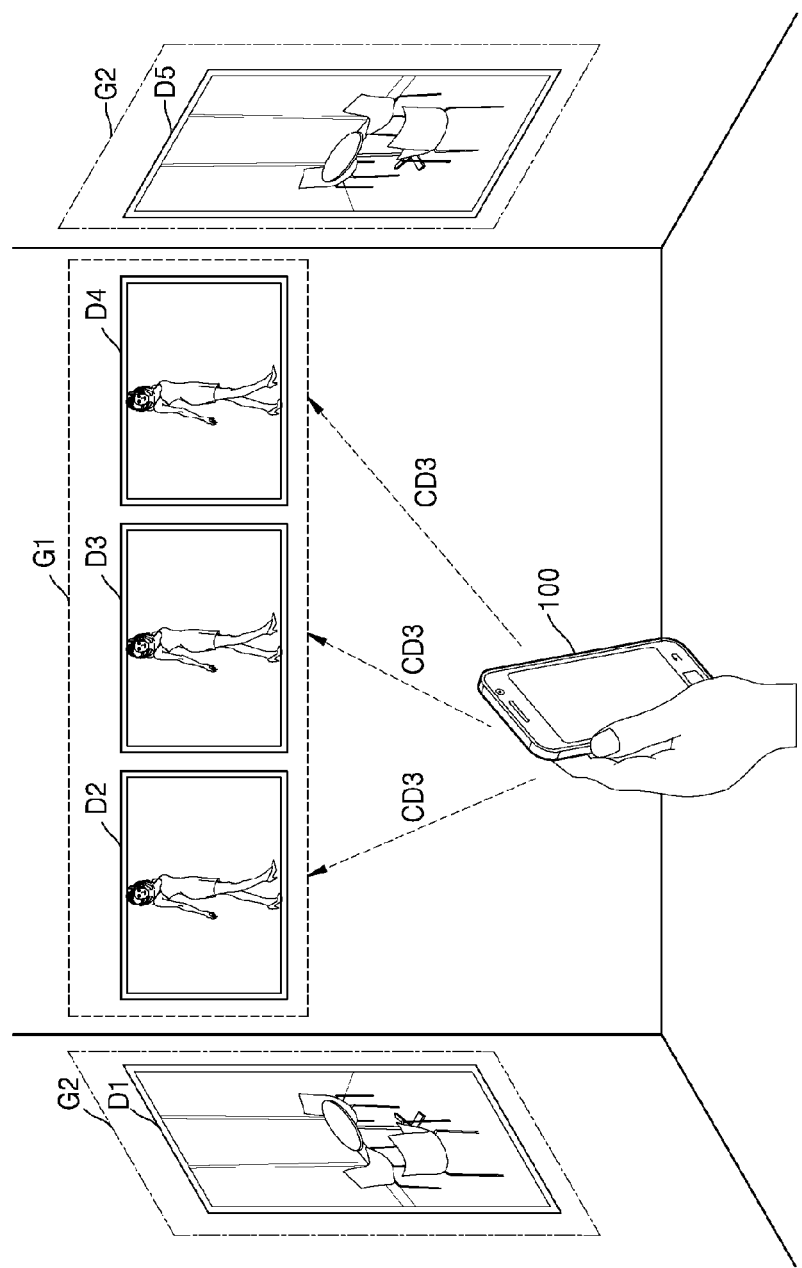

FIGS. 7 to 9 are diagrams illustrating operation of the electronic device 100 according to some exemplary embodiments after distributing content to the display devices D1 to D5 as shown in FIG. 5 and then updating content information as shown in FIGS. 6A and 6B.

Referring to FIG. 7, the electronic device 100 may search for at least one display device connected through a short-range network, for example, the first to fifth display devices D1 to D5.

Here, the second to fourth display devices D2 to D4 may store the first content information CD1 received from the electronic device 100 in FIG. 5, and the first and fifth display devices D1 and D5 may store the second content information CD2 received from the electronic device 100 in FIG. 5.

FIG. 8 shows an example in which the electronic device 100 shown in FIG. 7 according to some exemplary embodiments determines whether or not to deliver content information to the searched display devices D1 to D5.

Referring to FIGS. 7 and 8, the electronic device 100 may group the searched first to fifth display devices D1 to D5. The electronic device 100 may group the first to fifth display devices D1 to D5 based on preset group information. The group information may include preset relationships between the groups G1 and G2 and the identifiers of the display devices D1 to D5, that is, preset group-specific members. Because it is assumed that group information has been set in advance in the electronic device 100 as shown in FIG. 6B, the electronic device 100 may group the second to fourth display devices D2 to D4 into the first group G1 and group the first and fifth display devices D1 and D5 into the second group G2.

The electronic device 100 may determine whether to deliver the content information CD3 and CD2 to the groups G1 and G2, respectively. In FIG. 8, it is assumed that the electronic device 100 has determined to deliver the content information CD3 of the first group G1 and not to deliver the content information CD2 of the second group G2.

In various ways, the electronic device 100 may determine whether to deliver the content information CD3 and CD2 to the groups G1 and G2, respectively. For example, based on user input, the electronic device 100 may determine whether or not to deliver the content information CD3 and CD2. In another example, according to whether the content information CD3 and CD2 set according to the groups G1 and G2 has been changed, the electronic device 100 may determine whether or not to deliver the content information CD3 and CD2 to the groups G1 and G2, respectively. In other words, the electronic device 100 may make a determination according to whether content information has been updated after a latest distribution. After the content information CD1 and CD2 has been most recently distributed as shown in FIG. 5, content information of the first group G1 is updated from the first content information CD1 to the third content information CD3 as shown in FIGS. 6A-6B. In this case, the electronic device 100 may determine to deliver only the content information CD3 of the first group G1 which has been updated after the latest distribution.

In still another example, the electronic device 100 may compare content information which is stored in the display devices D1 to D5 according to the groups G1 and G2 with the content information CD3 and CD2 which is set in the electronic device 100 according to the groups G1 and G2, and determine to deliver content information to a group corresponding to set content information which is determined to be different from stored content information. In FIG. 7, content information of the second to fourth display devices D2 to D4 belonging to the first group G1, which is the first content information CD1, and content information of the first group G1 set in the electronic device 100, which is the third content information CD3, differ from each other. Therefore, the electronic device 100 may determine to deliver the content information CD3 of the first group G1. On the other hand, the content information CD2 of the first and fifth display devices D1 and D5 belonging to the second group G2 is the same as the content information CD2 of the second group G2 stored in the electronic device 100. Therefore, the electronic device 100 may determine not to deliver the content information CD2 of the second group G2. To this end, the electronic device 100 may receive the identifiers of content information stored in the respective display devices D1 to D5 from the display devices D1 to D5. For example, the identifiers of content information may be the content information itself or the version information of the content information, but are not limited thereto.

As described above, in various ways, the electronic device 100 may determine whether or not to deliver the content information CD3 and CD2 respectively to the groups G1 and G2, thus determining to deliver only the content information CD3 of the first group G1.

FIG. 9 is a diagram showing an example in which the electronic device 100 delivers content information after determining whether or not to deliver content information to respective groups as shown in FIG. 8.

Referring to FIG. 9, the electronic device 100 may deliver the content information CD3 of the first group G1 to the first group G1 which is a group determined as shown in FIG. 8. The second to fourth display devices D2 to D4 belonging to the first group G1 may output content based on the newly received content information CD3 instead of the existing content information CD1 (see FIG. 7). Therefore, the second to fourth display devices D2 to D4 may output content changed as shown in FIG. 7 and FIG. 9, so that scenes may be changed.

As described above, the electronic device 100 according to some exemplary embodiments may group the plurality of display devices D1 to D5 to set group information in advance, and set group-specific content information in advance. Subsequently, when the electronic device 100 searches for the plurality of display devices D1 to D5 connected through a short-range network, the electronic device 100 may group the searched display devices D1 to D5 and automatically deliver group-specific content information to a determined group among the searched display devices D1 to D5.

When the electronic device 100 according to some exemplary embodiments newly acquires content information or changes existing content information, the electronic device 100 may store the newly acquired or changed content information in conjunction with groups in order to set group-specific content information. When the user carrying the electronic device 100 visits a store, the electronic device 100 may automatically determine whether to deliver group-specific content information to preset groups, and deliver content information to a determined group. Therefore, according to some exemplary embodiments, the electronic device 100 may rapidly distribute updated content information to a plurality of display devices. According to some exemplary embodiments, the electronic device 100 manages and delivers content information according to groups, and thus may remove the inconvenience of receiving the setting of whether or not to deliver content information to each of a plurality of display devices or the setting of what kind of content information is to be delivered to each of the plurality of display devices from the user. In this way, the convenience and the satisfaction of the user of the electronic device 100 may be increased.

In other words, when the electronic device 100 according to some exemplary embodiments acquires updated content information and automatically searches for display devices which have been grouped by using a short-range communication method, the electronic device 100 may automatically distribute content information to the grouped display devices even without user input, so that the user may be provided with convenience.

Because the electronic device 100 and a plurality of display devices are connected through a short-range network, the user of the electronic device 100 and the plurality of display devices may be a short distance from each other. Therefore, the user of the electronic device 100 may see the plurality of display devices and scene changes of the plurality of display devices. In this way, the user may immediately determine whether or not desired content information has been distributed to the plurality of display devices properly.

Next, a case in which the electronic device 100 distributes content information to the display devices D1 to D5 as shown in FIG. 9 and then updates the content information again will be described with reference to FIGS. 10A-10-B, 11, 12A-12C, 13A-13B, and 14.

Figures 10A, 10B:
FIGS. 10A and 10B an example in which an electronic device according to some exemplary embodiments updates content information.

FIGS. 10A-10B show an example in which an electronic device according to some exemplary embodiments updates content information.

Referring to FIGS. 10A-10B, as shown in FIG. 10A, the electronic device 100 may store the identifiers (for example, of members of groups) and content information of display devices belonging to respective preset groups according to the preset groups. FIG. 10A is similar FIG. 6B.

Referring to FIG. 10B, the electronic device 100 may change the second content information CD2 which is content information of the second group G2 to fourth content information CD4. The fourth content information CD4 may be obtained by changing at least one of content and scheduling information of the content included in the second content information CD2. The electronic device 100 may generate the fourth content information CD4 by itself, obtain the fourth content information CD4 by modifying the second content information CD2 by itself, or receive the fourth content information CD4 from an external device connected through a wired or wireless communication network.

Also, the electronic device 100 may acquire fifth content information CD5. The electronic device 100 may generate the fifth content information CD5 or receive the fifth content information CD5 from an external device. The electronic device 100 may set no relationship between the fifth content information CD5 and a group.

As shown in FIG. 10B, the electronic device 100 may or may not associate the newly acquired content information CD4 and CD5 with a group.

In brief, content information of the first group G1 including the second to fourth display devices D2 to D4 may be the third content information CD3, content information of the second group G2 including the first and fifth display devices D1 and D5 may be the fourth content information CD4, and no relationship may be set between the fifth content information CD5 and a group.

FIGS. 11. 12A-12C, 13A-13B, 14, and 15 are diagrams illustrating an example of operation of the electronic device 100 and the display devices D1 to D5 after the electronic device 100 distributes content to the display devices D1 to D5 as shown in FIG. 9 and then updates content information as shown in FIGS. 10A-10B, according to some exemplary embodiments.

Referring to FIG. 11, the electronic device 100 may search for at least one display device connected through a short-range network, for example, the first to third display devices D1 to D3 and fifth to seventh display devices D5 to D7. In contrast to FIG. 9, it is assumed that the electronic device 100 has not searched the fourth display device D4 but has newly searched sixth and seventh display devices D6 and D7.

Here, the second and third display devices D2 and D3 may store the third content information CD3 received from the electronic device 100 in FIG. 9, and the first and fifth display devices D1 and D5 may store the second content information CD2. Initially, the newly searched sixth and seventh display devices D6 and D7 may not have any content information.

FIGS. 12A-12C show examples in which the electronic device 100 of FIG. 11 according to some exemplary embodiments groups the searched display devices D1 to D3 and D5 to D7 based on preset group information.

Referring to FIGS. 11 and 12, because it is assumed that group information is set in the electronic device 100 in advance as shown in FIG. 10B, the electronic device 100 may group the second and third display devices D2 and D3 into the first group G1 and group the first and fifth display devices D1 and D5 into the second group G2.

The electronic device 100 may group the newly searched sixth and seventh display devices D6 and D7 in various ways as shown in FIGS. 12A, 12B, and 12C.

Referring to FIG. 12A, the electronic device 100 does not have preset group information of the sixth and seventh display devices D6 and D7, and thus may set no group for the sixth and seventh display devices D6 and D7. Here, the electronic device 100 may recognize that the sixth and seventh display devices D6 and D7 which have not been grouped have been grouped into a preliminary group which has not been set as a specific group.

Referring to FIG. 12B, the electronic device 100 may automatically classify the sixth and seventh display devices D6 and D7 which have not been grouped in advance into a third group G3 which is a new group.

Referring to FIG. 12C, the electronic device 100 may classify the sixth display device D6 which has not been grouped in advance into the third group G3 which is a new group and the seventh display device D7 into a fourth group G4 which is a new group.

As shown in FIGS. 12A-12C, a method in which the electronic device 100 automatically groups the display devices D6 and D7 that have not been grouped in advance may be implemented in various ways.

Although the electronic device 100 automatically groups the searched display devices D1 to D3 and D5 to D7, the electronic device 100 may change grouping of the searched display devices D1 to D3 and D5 to D7 through user input.

FIGS. 13A-13B show an example in which the electronic device 100 according to some exemplary embodiments outputs the UI 10 for grouping the searched display devices D1 to D3 and D5 to D7.

Referring to FIG. 13A, the electronic device 100 may output the UI 10 for grouping the searched display devices D1 to D3 and D5 to D7. At this time, the UI 10 may show results in which the searched display devices D1 to D3 and D5 to D7 are automatically grouped based on preset group information. In FIG. 13A, it is assumed that the electronic device 100 has grouped the searched display devices D1 to D3 and D5 to D7 as show in FIG. 12A. The second and third display devices D2 and D3 may be grouped into the first group G1, the first and fifth display devices D1 and D5 may be grouped into the second group G2, and the sixth and seventh display devices D6 and D7 may not be grouped.

Referring to FIG. 13B, the electronic device 100 may classify the sixth and seventh display devices D6 and D7 into the third group G3 based on user input.

The groupings shown in FIG. 13B are just an example. The newly searched sixth and seventh display devices D6 and D7 may be grouped in various ways. For example, the sixth and seventh display devices D6 and D7 may be included in the preset groups G1 and G2). Also, the electronic device 100 may change preset groupings (e.g., FIG. 10B) through the UI 10. In this way, the electronic device 100 may group the searched display devices D1 to D3 and D5 to D7 in various combinations based on at least one of preset groupings (e.g., FIG. 10B) and user input.

FIG. 14 shows an example in which an electronic device according to some exemplary embodiments determines whether or not to deliver content information to each group.

Referring to FIG. 14, as groupings shown in FIGS. 13A-13B, members of the first group G1 are the second and third display devices D2 and D3, members of the second group G2 are the first and fifth display devices D1 and D5, and members of the third group G3 are the sixth and seventh display devices D6 and D7.

Here, the third content information CD3 and the fourth content information CD4 may be respectively set for the first group G1 and the second group G2 which are preset groups (see FIG. 10B). The electronic device 100 may set the fifth content information CD5 as content information of the newly formed third group G3. To this end, the electronic device 100 may output a UI for setting content information of the newly formed third group G3 on the screen. In some exemplary embodiments, the electronic device 100 may automatically set the fifth content information CD5 which has no set relationship with a group as shown in FIG. 10B as content information of the newly set third group G3.

The electronic device 100 may determine whether or not to deliver the content information CD3, CD4, and CD5 to the respective groups G1, G2, and G3, respectively. As described above with reference to FIG. 8, in various ways, the electronic device 100 may determine whether or not to deliver the content information CD3, CD4, and CD5 to the respective groups G1, G2, and G3, respectively. Also, when there is a newly formed group such as the third group G3, the electronic device 100 may automatically determine to deliver the content information CD5 of the third group G3 to the third group G3 which is the newly formed group.

In FIG. 14, it is assumed that the electronic device 100 determines to deliver the content information CD4 and CD5 of the second group G2 and the third group G3 respectively, and not to deliver the content information CD3 of the first group G1 to the first group G1. Whether to deliver content information to the respective groups G1, G2, and G3 shown in FIG. 14 is an example, and whether to deliver content information to the respective groups G1, G2, and G3 is not limited thereto.

Figure 15:
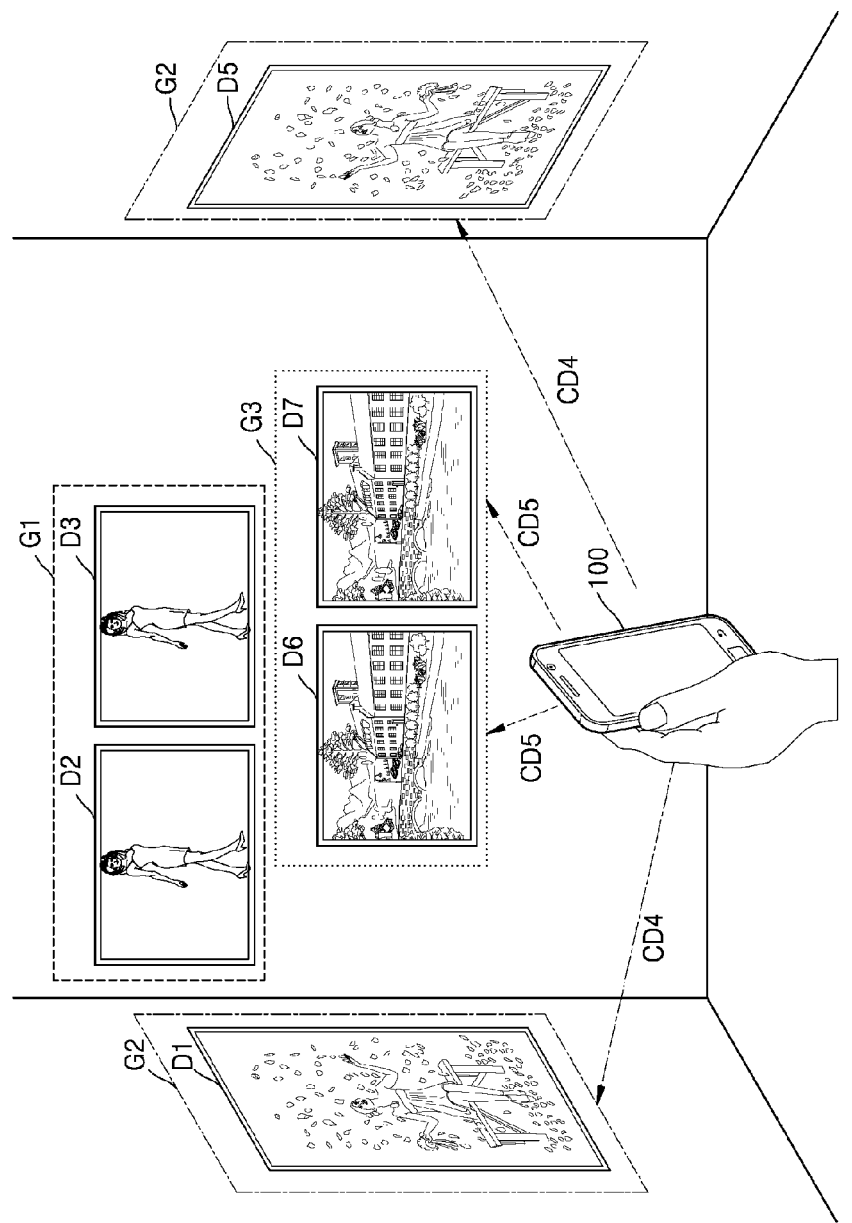

FIG. 15 is a diagram showing an example in which the electronic device 100 delivers content information after determining whether to deliver content information to respective groups as shown in FIG. 14.

Referring to FIG. 15, the electronic device 100 may deliver the content information CD4 and CD5 of the second group G2 and the third group G3 which are groups determined as shown in FIG. 14 to the second group G2 and the third group G3.

The first and fifth display devices D1 and D5 belonging to the second group G2 may output content based on the newly received content information CD4 instead of the existing content information CD2 (see FIG. 11). Therefore, the first and fifth display devices D1 and D5 may output content changed as shown in FIG. 11 and FIG. 15.

Also, the sixth and seventh display devices D6 and D7 belonging to the third group G3 may output the received content information CD5. Therefore, the sixth and seventh display devices D6 and D7 may output content as shown in FIG. 15 based on the newly received content information CD5 through the screens thereof which have output nothing as shown in FIG. 11.

In this way, the electronic device 100 according to some exemplary embodiments may group a plurality of display devices and manage content information according to groups, thus efficiently distributing the content information to the plurality of display devices.

Figure 16:
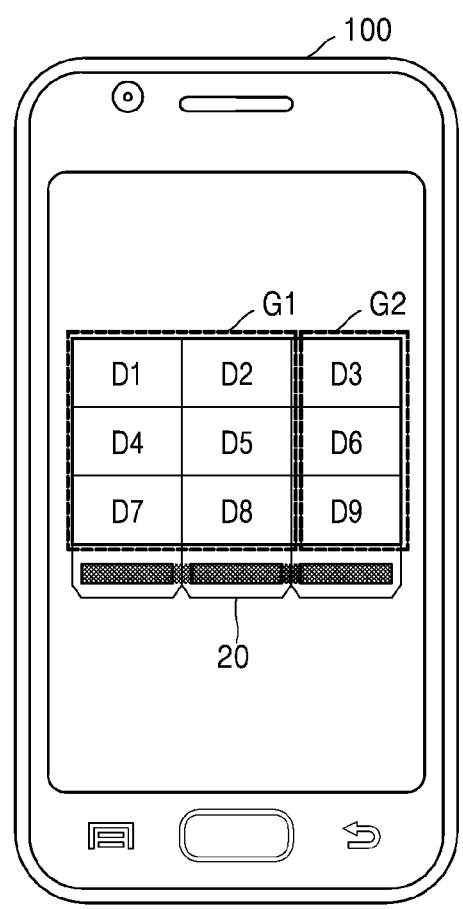
FIG. 16 shows an example of a user interface (UI) for grouping searched display devices which is output by an electronic device according to some exemplary embodiments.

FIG. 16 shows an example of a UI for grouping searched display devices which is output by an electronic device according to some exemplary embodiments.

Referring to FIG. 16, the electronic device 100 may output a UI 20 for grouping searched display devices D1 to D9 on the screen thereof. The electronic device 100 may output the UI 20 in a form corresponding to the arrangement of the respective searched display devices D1 to D9. Also, a plurality of rectangles included in the UI 20 and corresponding to the respective display devices D1 to D9 may be implemented as buttons, a key pad, etc. so that the user may select the respective corresponding display devices D1 to D9.

For example, the electronic device 100 may acquire image data obtained by photographing the display devices D1 to D9 in order to output the UI 20. The electronic device 100 may further include a camera for photographing the display devices D1 to D9. The electronic device 100 may detect the arrangement of the respective display devices D1 to D9 based on the image data obtained by photographing the display devices D1 to D9, and configure the UI 20. In another example, the electronic device 100 may configure the UI 20 based on an input of the user. In other words, the electronic device 100 may receive information on the number, arrangement, etc. of display devices from the user, and configure the UI 20. However, these are just examples, and a method of configuring the UI 20 is not limited thereto.

Based on at least one of user input and preset group information, the electronic device 100 may group the searched display devices D1 to D9. As shown in FIG. 16, the electronic device 100 may classify the first, second, fourth, fifth, seventh, and eighth display devices D1, D2, D4, D5, D7, and D8 into a first group G1, and classify the remaining third, sixth, and ninth display devices D3, D6, and D9 into a second group G2. Also, the UI 20 output on the screen by the electronic device 100 may include information (dotted lines for distinguishing between groups, and the group identifiers G1 and G2) indicating relationships between the searched display devices D1 to D9 and the set groups G1 and G2, and so on.

The user may intuitively recognize the arrangement of the searched display devices D1 to D9 through the UI 20, and readily distinguish the searched display devices D1 to D9 from each other. Therefore, the user may readily group the searched display devices D1 to D9 through the UI 20, and may readily and intuitively recognize relationships between the searched display devices D1 to D9 and the set groups. In this way, the convenience and the satisfaction of the user who uses the electronic device 100 may be increased.

Figure 17:
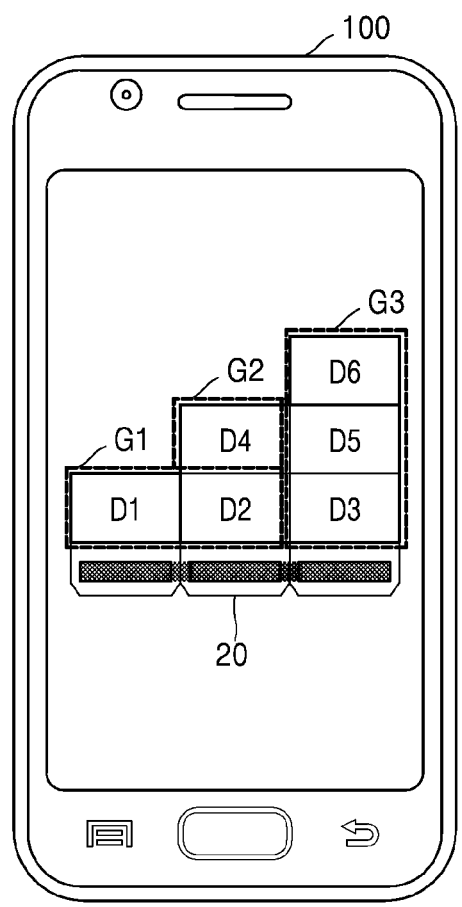
FIGS. 17 to 19 show examples of a UI for grouping which is output by an electronic device according to some exemplary embodiments.
Figure 18:
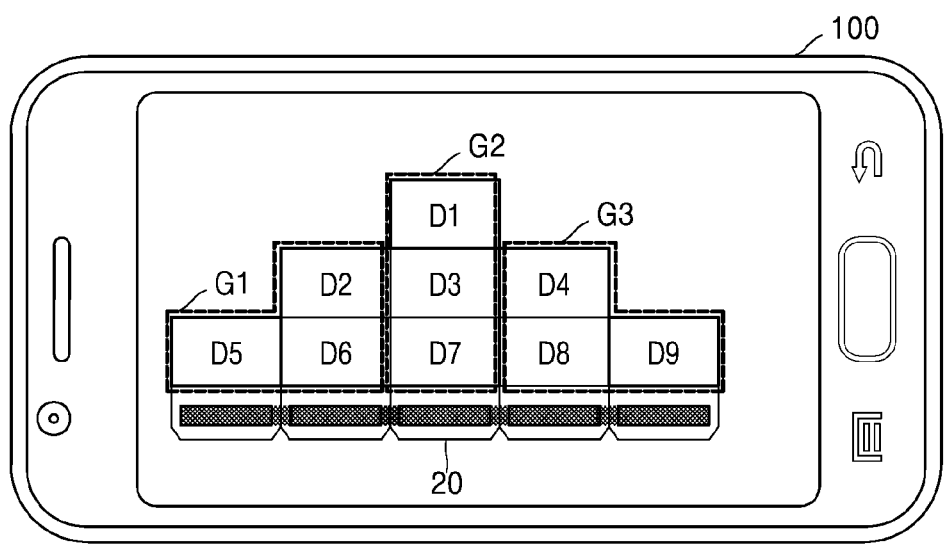
Figure 19:
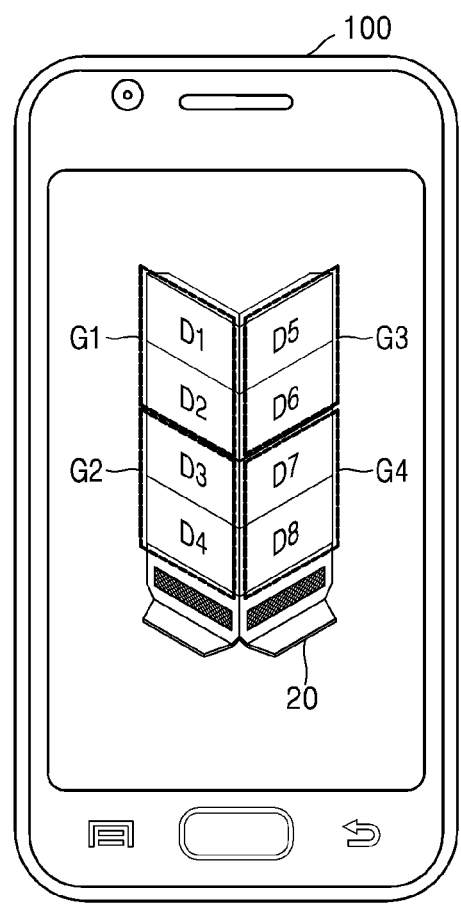

FIGS. 17 to 19 show examples of a UI for grouping which is output by an electronic device according to some exemplary embodiments.

Referring to FIGS. 17 to 19, the electronic device 100 may output the UI 20 for grouping in a form corresponding to the arrangement of respective searched display devices as described with reference to FIG. 16. Because it is possible to apply the description of FIG. 16 as it is, the description will not be reiterated.

Figure 20:
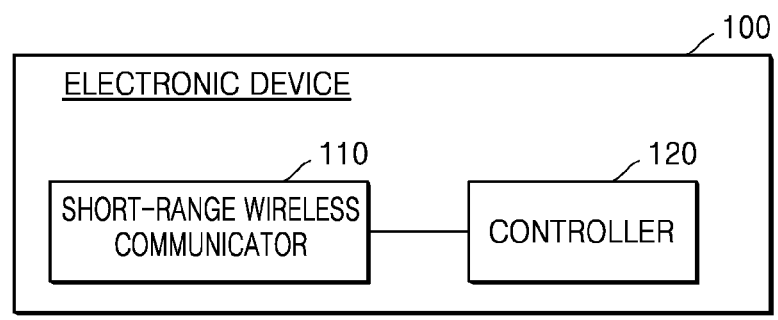
FIG. 20 shows a constitution of an electronic device according to some exemplary embodiments.

FIG. 20 shows an example constitution of the electronic device 100 according to some exemplary embodiments.

Referring to FIG. 20, the electronic device 100 may include a short-range wireless communicator 110 and a controller 120.

The short-range wireless communicator 110 is a unit which wirelessly connects the electronic device 100 to at least one piece of other electronic equipment, such as a display device, a predetermined distance away from the electronic device 100 and enables communication with each other. The short-range wireless communicator 110 may include a Bluetooth communicator, a BLE communicator, an NFC communicator, a WLAN (Wi-Fi) communicator, a ZigBee communicator, an IrDA communicator, a WFD communicator, a UWB communicator, an Ant+ communicator, a Z-wave communicator, etc., but is not limited thereto.

The controller 120 may control the overall operation of the electronic device 100 and process various data for operation of the electronic device 100. Control of the operation of the electronic device 100 described above with reference to the drawings and data processing for the operation both may be performed by the controller 120. The controller 120 may include a central processing unit (CPU), a microprocessor, a graphics processing unit (GPU), and so on.

The controller 120 may search for at least one display device connected through the short-range wireless communicator 110. The controller 120 may group the at least one searched display device into at least one group, and determine whether or not to deliver content information to each of the at least one group. Also, the controller 120 may control the short-range wireless communicator 110 to deliver content information set according to each group for which it has been determined to deliver the content information to the group.

The controller 120 may group the at least one searched display device into at least one group based on at least one of user input and preset group information.

The controller 120 may determine to deliver content information to a group corresponding to set content information which is determined to be different from content information stored in a display device of the group. To this end, the short-range wireless communicator 110 may receive the identifier of content information stored in each of the at least one display device from the at least one display device.

In some exemplary embodiments, the controller 120 may determine whether or not to deliver content information to each of the at least one group based on user input and whether or not content information set according to the at least one group has been changed.

The electronic device 100 may further include a display which outputs a UI for grouping the at least one searched display device. Here, the UI output by the display may be in a form corresponding to the arrangement of the respective at least one searched display device. The controller 120 may acquire image data obtained by photographing the at least one searched display device, and configure the UI based on the image data.

Also, the electronic device 100 may further include a user input interface which receives user input for setting a group name for identifying at least one group.

The electronic device 100 may further include a memory which stores at least one of group information indicating relationships between preset groups and the identifiers of display devices and preset group-specific content information.

Figure 21:
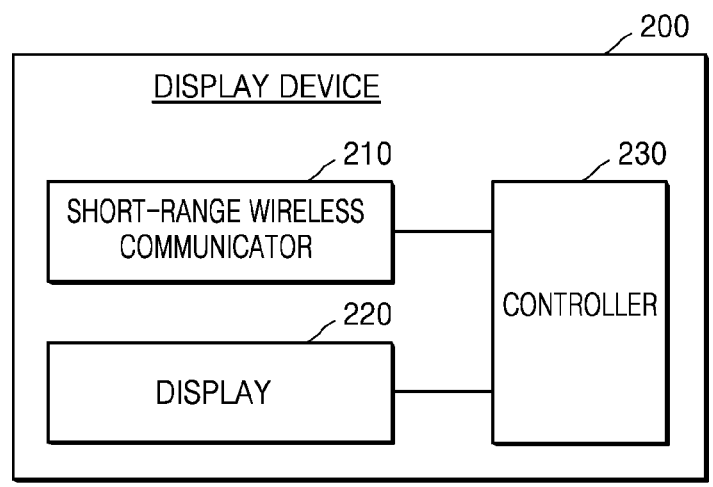
FIG. 21 shows a constitution of a display device according to some exemplary embodiments.

FIG. 21 shows an example constitution of a display device 200 according to some exemplary embodiments.

Referring to FIG. 21, the display device 200 may include a short-range wireless communicator 210, a display 220, and a controller 230.

The short-range wireless communicator 210 is a unit which wirelessly connects the display device 200 to a piece of other electronic equipment, such as an electronic device 100 (of FIG. 20), a predetermined distance away from the display device 200 and enables communication with each other. The short-range wireless communicator 210 may include a Bluetooth communicator, a BLE communicator, an NFC communicator, a WLAN (Wi-Fi) communicator, a ZigBee communicator, an IrDA communicator, a WFD communicator, a UWB communicator, an Ant+ communicator, a Z-wave communicator, etc., but is not limited thereto.

The short-range wireless communicator 210 may receive content information including at least one of content and scheduling information of the content from the electronic device 100 (for example, of FIG. 20).

The controller 230 may control the overall operation of the display device 200 and process various data for operation of the display device 200. Control of the operation of the display device 200 described above with reference to the drawings and data processing for the operation both may be performed by the controller 230. The controller 230 may include a CPU, a microprocessor, a GPU, and so on.

The controller 230 may output content on a screen of the display 220 based on the content information received from the electronic device 100 (for example, of FIG. 20) according to the scheduling information of the content.

The display device 200 may further include a memory which stores the content information.

The controller 230 may deliver the identifier of the content information stored in the memory to the electronic device 100 (of FIG. 20) connected through the short-range wireless communicator 210. For example, the identifier of the content information may be the content information itself or the version information of the content information, but is not limited thereto.

Figure 22:
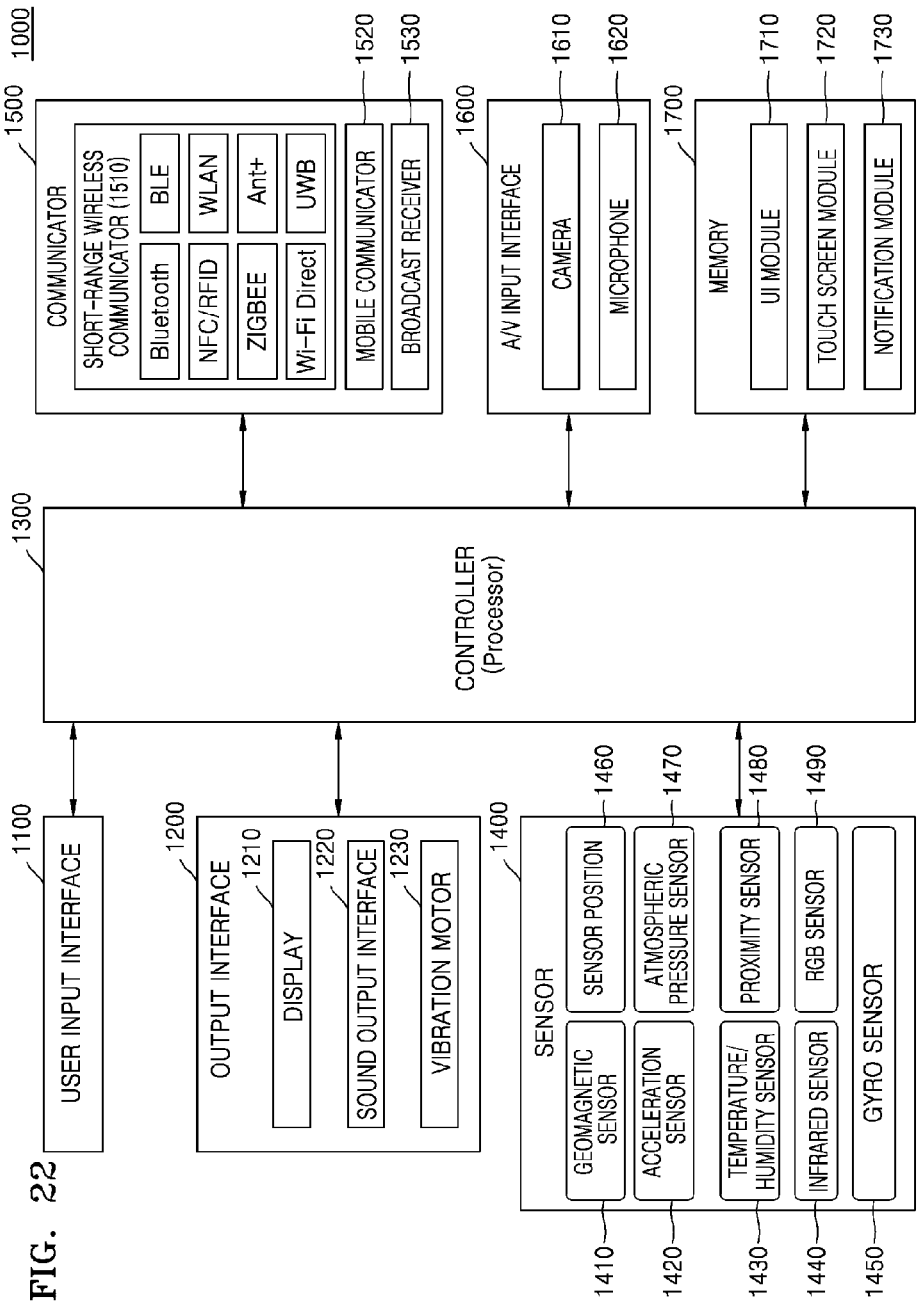
FIG. 22 is a block diagram showing a constitution of an electronic device according to some exemplary embodiments.

FIG. 22 is a block diagram showing a constitution of an electronic device 1000 according to some exemplary embodiments. The constitution of the electronic device 1000 shown in FIG. 22 may be applied to all the electronic devices described above. The short-range wireless communicator 110 and the controller 120 included in the electronic device 100 of FIG. 20 may correspond to a short-range wireless communicator 1510 and a controller 1300 of the electronic device 1000 of FIG. 22.

Also, the constitution of the electronic device 1000 of FIG. 22 may be similarly applied to the display device 200 (of FIG. 21) described above. The short-range wireless communicator 210, the display 220, and the controller 230 included in the display device 200 may correspond to the short-range wireless communicator 1510, a display 1210, and the controller 1300 of the electronic device 1000 of FIG. 22.

Referring to FIG. 22, the electronic device 1000 may include a user input interface 1100, an output interface 1200, the controller 1300, and a communicator 1500. However, all components shown in FIG. 22 are not essential components of the electronic device 1000. The electronic device 1000 may be implemented by more or less components than shown in FIG. 22.

In addition to the user input interface 1100, the output interface 1200, the controller 1300, and the communicator 1500, the electronic device 1000 according to some exemplary embodiments may further include a sensor 1400, an audio/video (A/V) input interface 1600, and a memory 1700.

The user input interface 1100 may include a unit to which a user inputs data for controlling the electronic device 1000. For example, the user input interface 1100 may be a key pad, a dome switch, a touchpad (a capacitive overlay touchpad, a resistive overlay touchpad, an infrared beam touchpad, a surface acoustic wave touchpad, an integral strain gauge touchpad, a piezoelectric effect touchpad, etc.), a jog wheel, a jog switch, etc., but is not limited thereto.

The output interface 1200 may output an audio signal, a video signal, or a vibration signal, and may include the display 1210, a sound output interface 1220, and a vibration motor 1230.

The display 1210 outputs information processed in the electronic device 1000. When the display 1210 and a touchpad are layered to constitute a touch screen, the display 1210 may be used as an input device as well as an output device. The display 1210 may include at least one of an LCD, a thin film transistor (TFT)-LCD, an OLED display, a flexible display, a 3D display, and an electrophoretic display. According to an implementation form of the electronic device 1000, the electronic device 1000 may include two or more displays 1210. Here, the two or more displays 1210 may be disposed to face each other by using a hinge.

The sound output interface 1220 outputs audio data received from the communicator 1500 or stored in the memory 1700. Also, the sound output interface 1220 outputs a sound signal (e.g., a call signal reception sound, a message reception sound, and a notification sound) related to a function performed by the electronic device 1000. The sound output interface 1220 may include a speaker, a buzzer, and so on.

The vibration motor 1230 may output a vibration signal. For example, the vibration motor 1230 may output a vibration signal corresponding to an output of audio data (e.g., a call signal reception sound and a message reception sound) or video data. Also, the vibration motor 1230 may output a vibration signal when a touch is input to the touch screen.

The controller 1300 may generally control the overall operation of the electronic device 1000. The controller 1300 may control the electronic device 1000 in order to perform operation of an electronic device (e.g., electronic device 100 of FIG. 1) of the drawings described above. For example, the controller 1300 may generally control the user input interface 1100, the output interface 1200, the sensor 1400, the communicator 1500, the A/V input interface 1600, etc. by executing programs stored in the memory 1700.

The controller 1300 according to some exemplary embodiments may search for at least one display device connected through the short-range wireless communicator 1510. The controller 1300 may group the at least one searched display device into at least one group, and determine whether or not to deliver content information to each of the at least one group. Also, the controller 1300 may control the short-range wireless communicator 1510 to deliver content information set according to each group for which it has been determined to deliver the content information to the group.

The controller 1300 may group the at least one searched display device into at least one group based on at least one of user input and preset group information.

The controller 1300 may determine to deliver content information to a group corresponding to set content information which is determined to be different from content information stored in a display device of the group. To this end, the short-range wireless communicator 1510 may receive the identifier of content information stored in each of the at least one display device from the at least one display device.

In some exemplary embodiments, the controller 1300 may determine whether or not to deliver content information to each of the at least one group based on user input and whether or not content information set according to the at least one group has been changed.

The display 1210 according to some exemplary embodiments may output a UI for grouping the at least one searched display device. Here, the UI output by the display 1210 may be in a form corresponding to the arrangement of the respective at least one searched display device. The controller 1300 may acquire image data obtained by photographing the at least one searched display device, and configure the UI based on the image data.

The user input interface 1100 may receive user input for grouping the at least one searched group. The user input interface 1100 may receive user input for setting a group name for identifying at least one group. Also, the user input interface 1100 may receive user input for determining whether or not to deliver content information to each group. The user input interface 1100 may receive user input for determining group-specific content information. Also, the user input interface 1100 may receive user input for generating, changing, storing, or outputting content information.

The sensor 1400 may sense a state of the electronic device 1000 or a state of the surroundings of the electronic device 1000, and deliver information about the sensed state to the controller 1300.

The sensor 1400 may include at least one of a geomagnetic sensor 1410, an acceleration sensor 1420, a temperature/humidity sensor 1430, an infrared sensor 1440, a gyro sensor 1450, a position sensor (e.g., GPS) 1460, an atmospheric pressure sensor 1470, a proximity sensor 1480, and a red, green, and blue (RGB) sensor (illuminance sensor) 1490, but is not limited thereto. Because functions of the respective sensors may be intuitively inferred from names thereof by those of ordinary skill in the art, detailed descriptions will be omitted.

The communicator 1500 may include the short-range wireless communicator 1510, a mobile communicator 1520, and a broadcast receiver 1530.

The short-range wireless communicator 1510 may include a Bluetooth communicator, a BLE communicator, an NFC communicator, a WLAN (Wi-Fi) communicator, a ZigBee communicator, an IrDA communicator, a WFD communicator, a UWB communicator, an Ant+ communicator, a Z-wave communicator, etc., but is not limited thereto.

The short-range wireless communicator 1510 may be a unit which wirelessly connects the electronic device 1000 to at least one piece of other electronic equipment, such as a display device, a predetermined distance away from the electronic device 1000 and enables communication with each other.

The mobile communicator 1520 exchanges wireless signals with at least one of a base station, an external terminal, and a server in a mobile communication network. Here, the wireless signals may include voice call signals, video call signals, or various types of data according to transmission and reception of text/multimedia messages.

The broadcast receiver 1530 receives at least one of a broadcasting signal and broadcast-related information from the outside of the electronic device 1000 through a broadcasting channel. The broadcasting channel may include a satellite channel and a terrestrial channel. According to an exemplary embodiment, the electronic device 1000 may not include the broadcast receiver 1530.

The A/V input interface 1600 is used to input an audio signal or a video signal, and may include a camera 1610, a microphone 1620, and so on. The camera 1610 may obtain a video frame of a still image, a moving image, etc. through an image sensor in a video call mode or a photography mode. The video frame captured through the image sensor may be processed by the controller 1300 or a separate image processing unit.

The video frame processed by the camera 1610 may be stored in the memory 1700 or transmitted to the outside through the communicator 1500. The camera 1610 may be two or more in number according to a constitution of the electronic device 1000.

The camera 1610 according to some exemplary embodiments may photograph at least one display device and acquire image data. The controller 1300 may configure a UI in a form corresponding to the arrangement of the respective at least one display device based on the image data.

The microphone 1620 receives a sound signal from the outside and processes the received sound signal into an electrical voice data. For example, the microphone 1620 may receive a sound signal from an external electronic device or a speaker. The microphone 1620 may use various noise removal algorithms for removing noise which is generated in the process of receiving a sound signal from the outside.

The memory 1700 may store programs for processing and controlling of the controller 1300, and store data input to or output from the electronic device 1000.

The memory 1700 may include at least one type of storage medium selected from the group consisting of a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, and an optical disc.

The programs stored in the memory 1700 may be classified into a plurality of modules according to functions thereof, for example, a UI module 1710, a touch screen module 1720, a notification module 1730, and so on.

The memory 1700 according to some exemplary embodiments may store at least one of group information which indicates relationships between preset groups and the identifiers of display devices and preset group-specific content information.

The UI module 1710 may provide a specialized UI, a graphic UI (GUI), etc. operated in conjunction with the electronic device 1000 according to applications. The touch screen module 1720 may sense a touch gesture of the user on the touch screen and deliver information on the touch gesture to the controller 1300. The touch screen module 1720 according to some exemplary embodiments may recognize and analyze a touch code. The touch screen module 1720 may be configured with separate hardware including a controller.

In order to sense a touch or a proximity touch, various sensors may be provided in or near the touch screen. One example of a sensor for sensing a touch on a touch screen is a tactile sensor. The tactile sensor is a sensor for sensing a contact of an object to the degree of tactile sensation of a human being or higher. The tactile sensor may sense various information, such as roughness of a contact surface, solidity of a contact object, and the temperature of a contact point.

One example of a sensor for sensing a touch on a touch screen is a proximity sensor.

The proximity sensor is a sensor which detects whether or not there is an object approaching a predetermined detection surface or whether or not there is an object near the predetermined detection surface using the force of an electromagnetic field or infrared rays without a mechanical contact. Examples of the proximity sensor are a transmissive photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, and so on. The touch gesture of the user may be a tap, a touch and hold gesture, a double tap, dragging, panning, a flick, a drag and stop gesture, a swipe, or so on.

The notification module 1730 may generate a signal for providing a notification of event occurrence in the electronic device 1000. Examples of an event occurring in the electronic device 1000 may be reception of a call signal, reception of a message, input of a key signal, notification of a schedule, and so on. The notification module 1730 may output a notification signal through the display 1210 in the form of a video signal, through the sound output interface 1220 in the form of a sound signal, or though the vibration motor 1230 in the form of a vibration signal.

Figure 23:
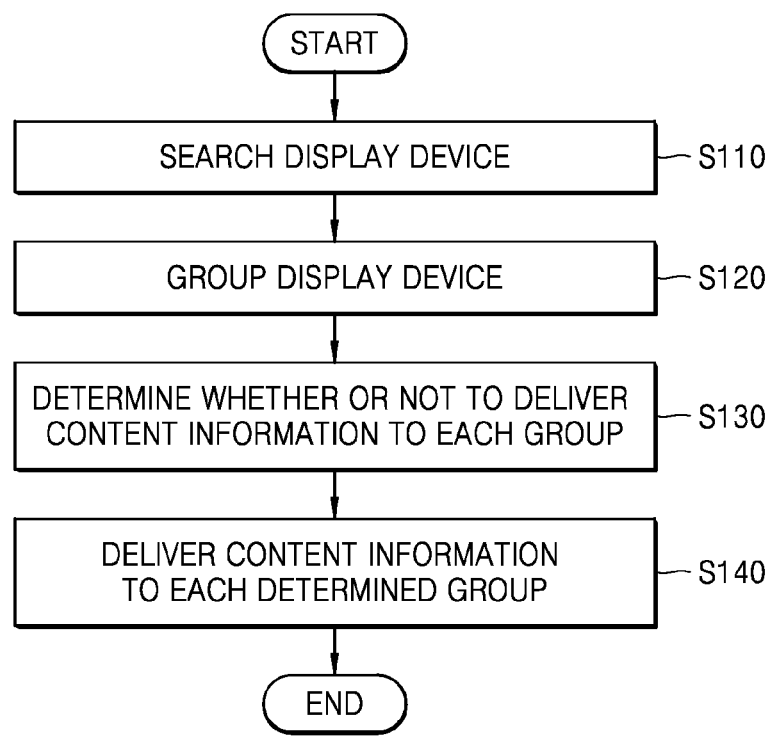
FIG. 23 is a flowchart of an operation method of an electronic device according to some exemplary embodiments.

FIG. 23 is a flowchart of an example operation method of an electronic device according to some exemplary embodiments.

Referring to FIG. 23, the electronic device may search for at least one display device connected through a short-range wireless communicator (S110). The electronic device may group the at least one display device into at least one group (S120). The electronic device may determine whether or not to deliver content information to each of the at least one group (S130). The electronic device may deliver content information set according to each group for which it has been determined to deliver the content information to the group through the short-range wireless communicator (S140).

In the operation of grouping the at least one display device (S120), the at least one display device may be grouped into at least one group based on at least one of user input and preset group information.

In the operation of determining whether or not to deliver content information to each of the at least one group (S130), the electronic device may determine to deliver content information to a group corresponding to set content information which is determined to be different from content information stored in a display device of the group.

The operation method of an electronic device may further include an operation of receiving an identifier of content information stored in each display device from the at least one display device through the short-range wireless communicator.

In some exemplary embodiments, in the operation of determining whether or not to deliver content information to each of the at least one group (S130), the electronic device may determine whether or not to deliver content information to each of the at least one group based on user input and whether or not content information set according to the group has been changed.

The operation method of an electronic device may further include an operation of outputting a UI for grouping the at least one searched display device on the screen of the electronic device.

The operation method of an electronic device may further include receiving user input for setting a group name for identifying the at least one group.

The UI may be output in a form corresponding to the arrangement of the at least one searched display device.

The operation method of an electronic device may further include an operation of acquiring image data obtained by photographing the at least one searched display device, and an operation of configuring the UI based on the image data.

The operation method of an electronic device illustrated in FIG. 23 may be performed by the electronic devices of the drawings described above. The respective operations of the operation method of an electronic device may be performed in the way described above. All the above descriptions of the previous drawings may be applied to the operation method of an electronic device illustrated in FIG. 23.

Meanwhile, the exemplary embodiments described above may be written as a computer-executable program, and may be implemented in a general-use digital computer which runs the program by using a computer-readable recording medium.

The computer-readable recording medium includes storage media, such as a magnetic storage medium (e.g., a ROM, a floppy disk, and a hard disk), and an optical storage medium (e.g., a CD-ROM and a DVD).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic device comprising:
a short-range wireless communicator; and
a controller configured to:
    search for a plurality of display devices through the short-range wireless communicator,
    group the plurality of display devices into a plurality of groups, each of the plurality of display devices being exclusively included in one of the plurality of groups,
    make a determination whether to deliver respective group-specific content information which is specific to each of the plurality of groups, to each of the plurality of groups, and
    control the short-range wireless communicator to deliver the respective group-specific content information to each of the display devices included in the group corresponding to the respective group-specific content based on the determination.

2. The electronic device of claim 1, wherein the controller is further configured to group the plurality of display devices into the plurality of groups based on at least one from among a user input and predetermined group information.

3. The electronic device of claim 1, wherein the controller is further configured to make the determination whether to deliver the content information to each of the plurality of groups if the group-specific content information is different from pre-stored content information stored in at least one display device of the plurality of groups.

4. The electronic device of claim 3, wherein the short-range wireless communicator is further configured to receive at least one identifier corresponding to the pre-stored content information stored in the at least one display device from the at least one display device.

5. The electronic device of claim 1, wherein the controller is further configured to make the determination whether to deliver the content information to each of the plurality of groups based on at least one from among user input and whether the group-specific content information has been changed.

6. The electronic device of claim 1, further comprising a display configured to output a user interface (UI) for grouping the plurality of display devices.

7. The electronic device of claim 6, further comprising a user input interface configured to receive user input for setting a plurality of group names for identifying the plurality of groups.

8. The electronic device of claim 6, wherein the UI output by the display is in a form corresponding to a physical arrangement of the plurality of display devices.

9. The electronic device of claim 8, wherein the controller is further configured to acquire image data obtained by photographing the plurality of display devices, and configure the UI based on the image data.

10. The electronic device of claim 1, further comprising a memory configured to store at least one from among group information indicating a relationship between the plurality of groups and at least one identifier of the plurality of display devices and predetermined group-specific content information.

11. An operation method of an electronic device, the operation method comprising:
   searching for a plurality of display devices through a short-range wireless communicator;
   grouping the plurality of display devices into a plurality of groups, each of the plurality of display devices being exclusively included in one of the plurality of groups;
   determining whether to deliver respective group-specific content information which is specific to each of the plurality of groups, to each of the plurality of groups; and
   delivering the respective group-specific content information to each of the display devices included in the group corresponding to the respective group-specific content through the short-range wireless communicator based on a result of the determining.

12. The operation method of claim 11, wherein the grouping of the plurality of display devices into the plurality of groups further comprises grouping the plurality of display devices into the plurality of groups based on at least one from among a user input and predetermined group information.

13. The operation method of claim 11, wherein the determining of whether to deliver the content information comprises determining to deliver the group-specific content information to each of the plurality of groups if the group-specific content information is different from pre-stored content information stored in at least one display device of the plurality of groups.

14. The operation method of claim 13, further comprising receiving at least one identifier of the pre-stored content information stored in the at least one display device from the at least one display device through the short-range wireless communicator.

15. The operation method of claim 11, wherein the determining of whether to deliver the content information comprises determining whether to deliver the group-specific content information to each of the plurality of groups based on at least one from among user input and whether the group-specific content information has been changed.

16. The operation method of claim 11, further comprising outputting a user interface (UI) for grouping the plurality of display devices on a screen.

17. The operation method of claim 16, further comprising receiving user input for setting a plurality of group names for identifying the plurality of groups.

18. The operation method of claim 16, wherein the UI is output in a form corresponding to a physical arrangement of the plurality of display devices.

19. The operation method of claim 18, further comprising:
   acquiring image data obtained by photographing the plurality of display devices; and
   configuring the UI based on the image data.

20. A non-transitory computer-readable recording medium in which a program for implementing the operation method of claim 11 is recorded.

* * * * *